April 30, 1929. A. J. FISHER 1,711,310
DOOR STILE FOR AUTOMOBILE BODIES
Original Filed June 14, 1926  4 Sheets-Sheet 3

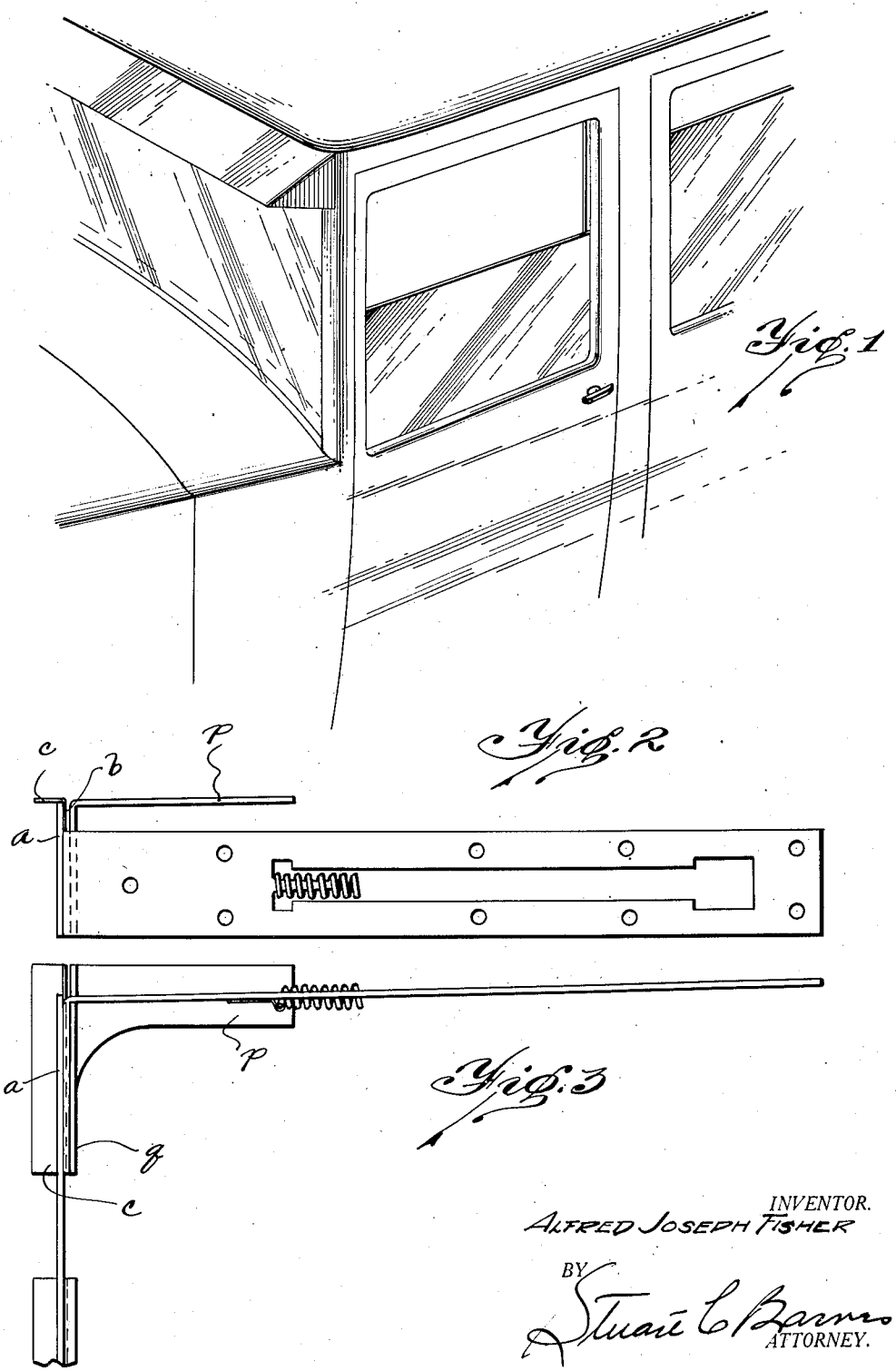

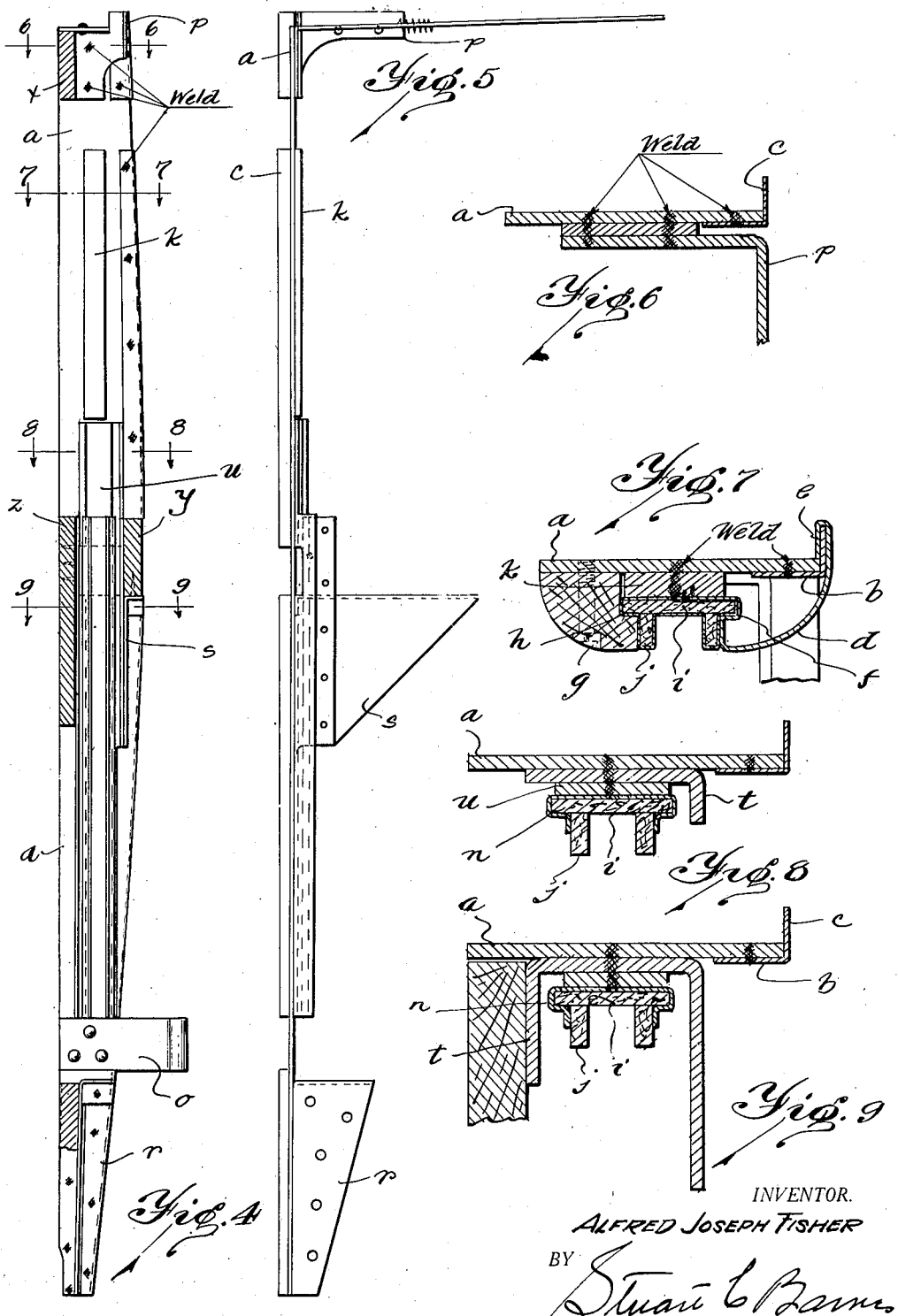

INVENTOR.
ALFRED JOSEPH FISHER
BY
Stuart C. Barnes
ATTORNEY.

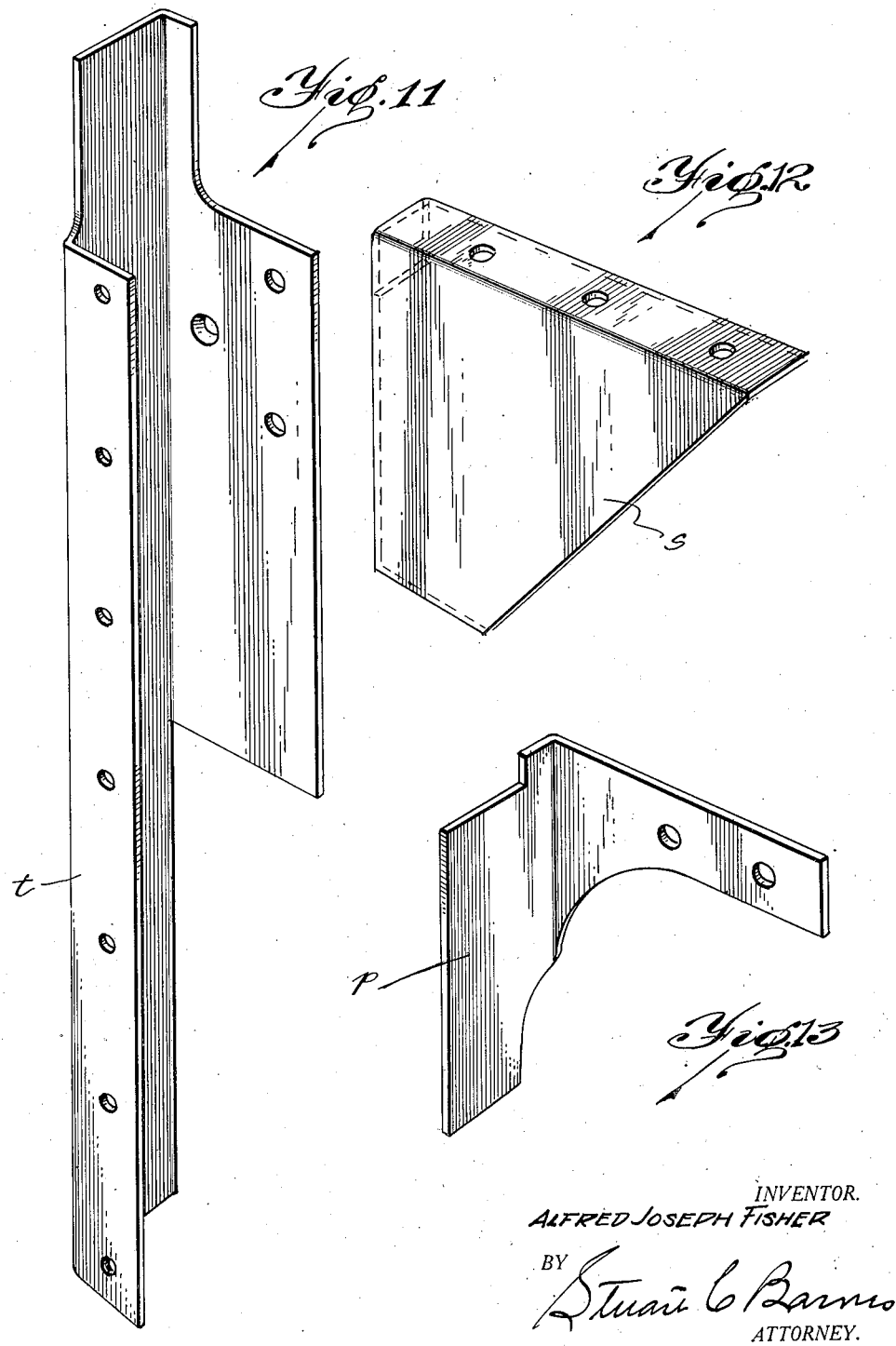

Patented Apr. 30, 1929.

1,711,310

UNITED STATES PATENT OFFICE.

ALFRED JOSEPH FISHER, OF DETROIT, MICHIGAN, ASSIGNOR TO GENERAL MOTORS CORPORATION, OF DETROIT, MICHIGAN, A CORPORATION OF DELAWARE.

DOOR STILE FOR AUTOMOBILE BODIES.

Substitute of application Serial No. 115,802, filed June 14, 1926. This application filed April 11, 1928. Serial No. 269,274.

This invention relates to door stiles for automobiles bodies. The present tendency in body construction is to eliminate as far as possible the so-called blind spot at the windshield pillar. To this end various modifications of the door stile and the windshield pillar have been made to cut down their total cross section.

It is not broadly new to use a relatively thin door stile, or guide for the sash or glass panel as shown, for instance, in the British patent to Porritt 151,724, accepted September 28, 1920. In the days of the convertible automobile it was common to use channel flappers for guiding the sliding panel above the belt line of the door, and these very materially cut down the cross section of the windshield.

It is the purpose of the present invention to substitute for the usual wooden door stile or sheet metal door stile, a stile built up on a heavy gauge, strip-like base. This makes a stile which is heavy and strong enough to support the hinges, and which at the same time is of minimum thickness so as to very materially reduce the cross section of the combined stile and windshield post. This stile differs from the sheet metal stiles that have been proposed by employing a heavy steel member to take the strains and stresses and to support the lighter sheet metal door upper panel and the inside garnish.

This also makes a construction, which to a casual observer does not look different from the ordinary wooden stile except for its extreme thinness, and which at the same time has as much, if not greater, strength than the ordinary wooden stile. Another feature of the invention is the arrangement of fastening the door check plate and anchoring it onto the heavy door stile strip.

Referring to the drawings:

Fig. 1 is a fragmentary perspective of an automobile body showing a door embodying the new improved door stile.

Fig. 2 is a plan view of the top of the improved door stile, including the door check plate.

Fig. 3 is a side elevation of the top of the stile, including part of the door check, but without the garnish molding or door upper panel in place.

Fig. 4 is an elevation of the door stile looking in from the window opening. The garnish molding and the door upper panel are not in place.

Fig. 5 is a side elevation of the same.

Figs. 6, 7, 8 and 9 are sections taken on the corresponding section lines of Fig. 4.

Fig. 11 is a perspective of the reinforcing channel.

Fig. 12 is a perspective of the belt bar bracket.

Fig. 13 is a perspective of the top rail bracket.

Figure 10:
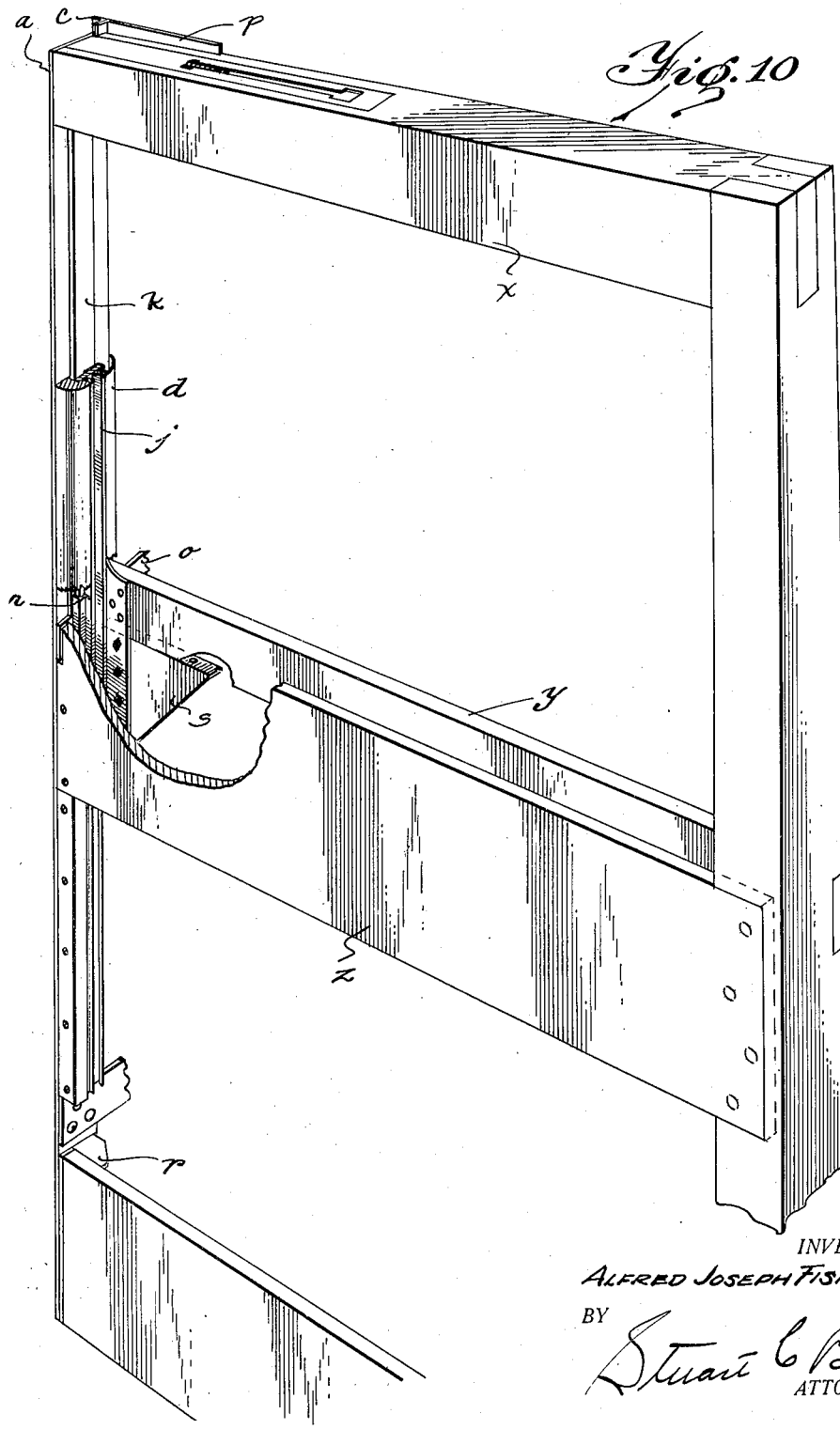
Fig. 10 is a perspective of a door equipped with the improved stile, some of the parts being shown in section or cut away.

The heavy gauge metal strip $a$ is fashioned to the contour of the edges of the door, as will be clearly apparent in Fig. 4, it being considerably wider at the top than at the bottom, and still wider near the belt line. This strip $a$ has spot-welded to it a thin metal angle strip $b$ with an outwardly, perpendicularly extending flange $c$ around which the door upper panel edge of sheet metal is folded. This panel is designated $d$, and the fold is designated $e$. The inner edge of this panel is folded to form the groove $f$, while the wooden garnish molding $g$ is cut to form a corresponding rabbet $h$. These grooves form an anchor for the base strip $i$ of the felt or rubber window guide $j$, as explaned and claimed in the Simpson Patent No. 1,463,444.

In order to build out this window guide to the appropriate depth, the heavy filler strip of metal $k$ is spot-welded to the strip $a$. Near the belt line the stamped reinforcing channel $t$ is spot-welded to the base strip $a$, together with a thinner filler strip $u$ and a window guide retaining strip $n$.

A belt-bar bracket $s$ is spot-welded to the reinforcing channel. This bracket supports the belt bar $y$ to which it may be secured by screws. The purpose of the filler strips is to build the window guide out to the depth of the hinge wings. These hinges of course can be welded to the base strip, but preferably are secured thereto by suitable machine screws.

At the top of the stile the base strip $a$ (see Figs. 2 and 3) is reinforced by a corner bracket $p$ arranged to carry the top rail $x$ of the door and the door upper panel. Between the web of this corner bracket is welded the downwardly-turned flange $q$ on the door plate of the Fauser door check described and claimed in the two Fauser Patents 1,532,239 and 1,574,340. At the bottom of the base a similar corner bracket *r* is welded to the base strip and is arranged to carry the bottom rail of the door.

A lock board *z* is secured by screws to the channel reinforcing strip.

This application is filed as a continuation of and substitute for application Serial No. 115,802, filed June 14, 1926.

What I claim is:

1. An automobile door stile, comprising a heavy metal base strip, a channel reinforcing strip secured to the inside face of the base strip, and a belt-board bracket secured to the reinforcing strip.

2. An automobile door including a heavy metal base strip forming the stile, a door check plate having a downwardly-depending flange and a corner bracket for holding the top door rail, the flange of the check plate secured in between the corner bracket and the top of the base strip.

3. A door, comprising a stile having a heavy metal base strip, a sheet metal panel supported on one edge of the base strip, a garnish molding secured to the other edge of the base strip, a window guide intervening between the panel and garnish molding, a channel member secured to the base strip, a lock board secured to one flange of the channel member, and a belt board secured to the other flange of the channel.

4. A door, comprising a stile having a heavy metal base strip, a sheet metal panel supported on one edge of the base strip, a garnish molding secured to the other edge of the base strip, a window guide intervening between the panel and garnish molding, a chanel member secured to the base strip, a belt board bracket having an outwardly turned horizontal flange secured to the one flange of the channel, a belt bar supported on said outwardly turned flange, and also secured to the adjoining flange of the channel member, and a lock board secured to the other flange of the channel member.

5. An automobile door, comprising a base strip of a heavy flat piece of stock, an outer panel member secured to said base strip near one edge, a garnish molding secured to the base strip near the other edge, a window guide intervening between the garnish molding and the panel, a top rail secured to the base strip at the top of the same, and a slotted header plate mounted on the top of the top rail and having a turned over flange which turns down and parallels the flat base strip of the stile and is anchored thereto.

In testimony whereof I have affixed my signature.

ALFRED JOSEPH FISHER.